(12) United States Patent
Fukuzawa et al.

(10) Patent No.: US 7,008,683 B2
(45) Date of Patent: Mar. 7, 2006

(54) OPTICAL DISC AND METHOD FOR MANUFACTURING THE SAME

(75) Inventors: Narutoshi Fukuzawa, Tokyo (JP); Hiroshi Take, Tokyo (JP); Hiroshi Kawahara, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/793,280

(22) Filed: Mar. 5, 2004

(65) Prior Publication Data

US 2004/0175531 A1    Sep. 9, 2004

(30) Foreign Application Priority Data

Mar. 7, 2003    (JP)    ............... 2003-060914

(51) Int. Cl.
*B32B 3/02*    (2006.01)
(52) U.S. Cl. ............... 428/64.1; 428/64.4; 428/402; 430/270.11
(58) Field of Classification Search ............... 428/64.1, 428/64.4, 64.5, 402; 430/270.11, 270.13
See application file for complete search history.

(56) References Cited

U.S. PATENT DOCUMENTS

| | | | | |
|---|---|---|---|---|
| 5,800,606 A | * | 9/1998 | Tanaka et al. | 106/287.16 |
| 5,974,025 A | * | 10/1999 | Yamada et al. | 369/288 |
| 6,696,515 B1 | * | 2/2004 | Yamaya et al. | 524/506 |
| 6,858,294 B1 | * | 2/2005 | Tanaka et al. | 428/329 |
| 2004/0218511 A1 | * | 11/2004 | Kondo et al. | 369/288 |

FOREIGN PATENT DOCUMENTS

| | | |
|---|---|---|
| JP | 63-188837 | 8/1988 |
| JP | 5-81702 | 4/1993 |
| JP | 10-241206 | 9/1998 |
| JP | 2002-74749 | 3/2002 |

OTHER PUBLICATIONS

U.S. Appl. No. 10/793,278, filed Mar. 05, 2004, Fukuzawa et al.
U.S. Appl. No. 10/793,280, filed Mar. 05, 2004, Fukuzawa et al.
U.S. Appl. No. 10/793,040, filed Mar. 05, 2004, Fukuzawa et al.

* cited by examiner

*Primary Examiner*—Elizabeth Mulvaney
(74) *Attorney, Agent, or Firm*—Oblon, Spivak, McClelland, Maier & Neustadt, P.C.

(57) ABSTRACT

An optical disc is includes a recording layer, a reflective layer, and a protective layer provided, in that order, on one surface of a light-transmissive substrate and a hard coating layer having a thickness in the range of 1 to 5 μm on the other surface of the substrate. The hard coating layer is formed by applying and curing a solution comprising a hard coating agent containing colloidal silica and a UV-curable acrylic resin and a solvent containing propylene glycol monomethyl ether acetate as a principal constituent. The hard coating layer contains 110 mg/cm$^3$ or less of residual solvent.

9 Claims, 2 Drawing Sheets

OPTICAL DISC AND METHOD FOR MANUFACTURING THE SAME

BACKGROUND OF THE INVENTION

1. Field of the Invention

The present invention relates to optical discs and methods for manufacturing the same. In particular, the present invention relates to a high-strength, durable optical disc whose abrasion resistance and scratch resistance at the light-incident surface side, where writing is performed, are increased to prevent the deterioration of the writing and reading characteristics, and to a method for manufacturing the same.

2. Description of the Related Art

The packing density and storage capacity of optical discs for recording various types of information, such as audio data, image data, and computer data, have been remarkably increasing, and new types of products, such as compact discs (CD media), mini Discs (MD media), and digital versatile discs (DVD media), are being introduced on the market one after another, accordingly. In general, such an optical disc includes a recording layer and a reflective layer on a substrate, and is further covered with a protective layer. The substrate, from which writing and reading laser beams come in, is generally formed of polycarbonate (PC).

As the optical disc becomes widespread, writing or reading errors increase due to scratches at the light-incident side surface of the substrate. Accordingly, it becomes required to provide a hard coating layer over the light-incident side surface of the substrate. More specifically, since PC constituting the substrate does not have an adequate abrasion resistance, it has been proposed that a hard coating layer is provided over the surface of the PC substrate to increase the abrasion resistance. This technique has been put into practice for some optical discs.

In order to increase the abrasion resistance or scratch resistance of the hard coating layer, Japanese Unexamined Patent Application Publication Nos. 2001-139884 and 2002-30150 have disclosed hard coating agents respectively containing a hydrolysate containing silicon of polyfunctional organoalkoxysilane and a specific dimethylsiloxane compound, and optical discs using the respective hard coating agents. Also, Japanese Unexamined Patent Application Publication No. 2001-344821 has disclosed an optical disc including a hard coating layer comprising at least two transparent cured material sub-layers whose outermost layer and adjoining internal layer contain a specific material; Japanese Unexamined Patent Application Publication No. 2001-344816 has disclosed an optical disc including a hard coating layer comprising a transparent cured film containing a specific polyfunctional material and polysilazane.

However, as the demand for optical discs grows, optical discs having superior abrasion resistance and scratch resistance become desired and the foregoing techniques have become unsatisfactory. In particular, fine cracks causing recording errors can occur at the surface of the hard coating layer during storage. A new technique is desired to prevent the occurrence of the cracks.

SUMMARY OF THE INVENTION

Accordingly, the object of the present invention is to provide a high-strength, abrasion- and scratch-resistant optical disc with storage reliability whose hard coating layer on the light-incident side surface of a substrate is improved to prevent crack occurrence due to lapse of time, and a method for manufacturing the same.

The inventors of the present invention have conducted intensive research to accomplish these objects, and discovered that the storage reliability, which has been considered to be dependent on only thickness, is greatly influenced by the content of the solvent in the hard coating layer, remaining after polymerization curing.

Specifically, although the hard coating layer is required to have a certain degree of thickness to satisfy the requirements for abrasion resistance and scratch resistance, a larger thickness of the hard coating layer is liable to cause a crack at the surface if it is stored at high temperatures in the range of about 75 to 95° C. In addition, same problem occurred even in a small thickness when the hard coating layer contained a large amount of residual solvent. Hence, it has been found that the thickness and the possibility of cracks do not always have a correlation and that the residual solvent content is also a factor in cracks.

Thus, the inventors have discovered that a hard coating layer formed of a new solvent-diluted hybrid hard coating agent with a thickness in a predetermined range, containing a predetermined amount of residua solvent leads to superior resistance and scratch resistance.

According to an aspect of the present invention, an optical disc is provided which includes a recording layer, a reflective layer, and a protective layer provided, in that order, on one surface of a light-transmissive substrate and a hard coating layer having a thickness in the range of 1 to 5 $\mu$m on the other surface of the substrate. The hard coating layer is formed by applying and curing a solution comprising a hard coating agent containing colloidal silica and a ultra violet (UV)-curable acrylic resin and a solvent containing propylene glycol monomethyl ether acetate as a principal constituent. The hard coating layer contains 110 mg/cm$^3$ or less of residual solvent. The principal constituent herein refers to a constituent having the highest content to the total amount of the solvent.

Preferably, the colloidal silica has a mean particle size of 100 nm or less, and preferably, the colloidal silica content in the hard coating agent is 40 percent by weight or more relative to the total solid content in the hard coating agent. Preferably, the difference between haze values of the hard coating layer before and after an abrasion test is in the range of 2% to 10%. The haze values are obtained from a haze test in accordance with JIS K 7136, and the abrasion test is conducted in accordance with JIS K 7204, using an abrasion wheel CS10F at a load of 500 g and 500 revolutions.

According to another aspect of the present invention, a method for manufacturing the optical disc is provided. The method includes the step of forming the hard coating layer by applying the hard coating solution onto the light-transmissive substrate by spin coating at a rotation speed of 8000 rpm or more and a holding time of 0.5 seconds or more and curing the solution without heating and drying.

The resulting optical disc, whose hard coating layer over the light-incident side surface of the substrate is improved, exhibits high strength, excellent abrasion resistance and scratch resistance, and superior storage reliability, and is capable of preventing crack occurrence due to lapse of time.

DESCRIPTION OF THE PREFERRED EMBODIMENTS

Preferred embodiments of the present invention will now be described with reference to the drawings.

Figure 1:
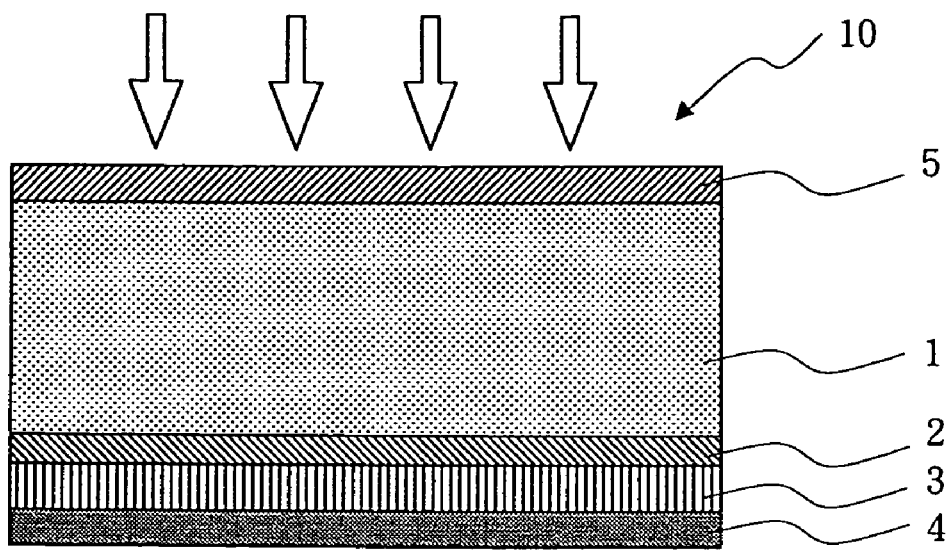
FIG. 1 is a schematic sectional view of an optical disc according to an embodiment of the present invention.

FIG. 1 shows a schematic sectional view of an optical disc according to a preferred embodiment of the present invention. The optical disc 10 shown in FIG. 1 includes a recording layer 2, a reflective layer 3, and a protective layer 4 on one surface of a light-transmissive substrate 1 and a hard coating layer 5 on the other surface. Light enters from the hard coating layer side to write and read. The present invention is intended to improve the hard coating layer 5 provided on the light-incident side.

The hard coating layer 5 is formed of a hybrid hard coating agent containing colloidal silica and a UV-curable acrylic resin. While known hard coating agents are not generally of hybrid type and do not require use of solvents, the hard coating agent constituting the hard coating layer 5 is of a solvent-diluted type that ensures the dispersibility of colloidal silica and coating characteristics. A solution of this hard coating agent diluted with a solvent is applied to form the hard coating layer 5. Non-solvent-type hard coating agents are difficult to compound. Also, even if colloidal silica is sufficiently dispersed, the viscosity is increased to negatively affect film formation.

The UV-curable acrylic resin is not particularly limited, and is appropriately selected from known ones. The colloidal silica, preferably, has a mean particle size of 100 nm or less. An excessively large particle size may degrade not only surface smoothness, but also optical transparency to negatively affect optical characteristics.

Propylene glycol monomethyl ether acetate (PGMEA) is use as the solvent. PGMEA does not attack PC, which is generally used for the substrate, and has good usability. The solvent of the hard coating agent essentially contains PGMEA, and PGMEA may be used in combination with another solvent. For combination, the PGMEA content in the entire solvent must be at least 75 percent by weight.

As for the proportion of the colloidal silica and the UV-curable acrylic resin in the hard coating solution, preferably, the colloidal silica content is 40 percent by weight or more relative to the total solid content. The hybrid hard coating solution exhibits extremely high lubricity and leads to high hardness advantageously, and a colloidal silica content of 40 percent by weight or more further enhances these advantages. Preferably, the solvent content is 20 percent by weight or more relative to the total amount of the hard coating agent from the viewpoint of obtaining a suitable thickness, and is 80 percent by weight or less from the viewpoint of easy-handling viscosity of the solution.

The residual solvent content in the resulting hard coating layer 5, after curing, is preferably 110 mg/cm$^3$ or less, and more preferably in the range of 10 to 100 mg/cm$^3$. By setting the residual solvent content in these ranges, crack occurrence due to lapse of time can be advantageously prevented to achieve a hard coating layer 5 and, thus, optical disc having a high storage reliability. In general, it is considered that a low residual solvent content is better than a high content. However, an excessively low content may cause the colloidal silica to flocculate and thus to make the composition of the hard coating layer nonuniform. The residual solvent content of 110 mg/cm$^3$ or less means that, for example, a 4-$\mu$m-thick hard coating layer over a DVD of 12 cm in diameter with a clamping area of 3.5 cm in diameter contains 4553 $\mu$g or less of residual solvent.

The thickness of the hard coating layer 5 is set in the range of 1 to 5 $\mu$m. While a thickness of smaller than 1 $\mu$m tends to result in an insufficient abrasion resistance and scratch resistance, a thickness of larger than 5 $\mu$m is liable to cause a warp in the resulting optical disc. In particular, an excessively large thickness is liable to cause cracks under high temperatures and degrades cost efficiency.

The hard coating layer 5 is formed by applying the hard coating solution onto the light-incident side surface of the substrate 1 and subsequently exposing the coating layer to UV light to initiate polymerization for curing. Preferably, the application is performed at a rotation speed of 8000 rpm or more, particularly in the range of 8000 to 12000 rpm, and a holding time of 0.5 seconds or more, particularly in the range of 1 to 10 seconds. On the other hand, known solvent-diluted hard coating solutions require the additional heating step of evaporating the solvent. Unfortunately, heating before UV curing may cause a monomer constituent to attack the substrate 1. In the present invention, the above-described solvent is used, and the rotation speed of spin coating is increased from conventional speeds in the range of 4000 to 5000 rpm to a high speed of 8000 rpm or more. Thus, the hard coating agent can be cured without a heating step. Consequently, negative effects on the substrate are eliminated and manufacturing time is reduced. The rotation speed refers to a final speed of spin coating. For example, the initial rotation speed may be set in the range of 300 to 500 rpm when the hard coating solution is deposited on the substrate 1, and be gradually increased to a speed in the above-described range. The same is applied to the following.

Preferably, the difference between haze values of the hard coating layer 5 obtained from the haze test in accordance with JIS K 7136 before and after the abrasion test with an abrasion wheel CS10F at a load of 500 g and 500 revolutions in accordance with JIS K 7204 is in the range of 2% to 10%. By setting the change in haze value in this range, high strength required for the hard coating layer 5 can be ensured.

The optical disc requires only that the hard coating layer 5 satisfies the above-described requirements, and the other layers are not particularly limited. For example, the optical disc may be of a write-once type using an inorganic material, as shown in FIG. 1, or of a rewritable type using a below-described phase change material. The present invention also includes an optical disc having a layered structure as shown in the figure bonded with an adhesive layer (not shown in the figure) on at least one side.

The light-transmissive substrate 1 may be formed of macromolecular materials, such as PC, acrylic resin, polystyrene, epoxy resin, polyester, vinyl chloride resin, and olefin resin, and inorganic material, such as glass. The formation of the substrate 1 is performed so as to transfer the pre-grooves of a matrix by injection molding for use of a resin material, or by photopolymerization (2P process) for use of glass.

The recording layer 2 comprises an organic dye film for writing and reading. Any organic dye film may be used as long as it can absorb writing laser beams to physically or chemically cause shape and optical characteristic changes that can be read by a reading laser beam. In order to locally modify the film, a phthalocyanine, cyanine, or azo dye having an absorption band in the semiconductor laser wavelength band may be used. These dyes may be used singly or in combination, and a singlet oxygen quencher, a UV absorber, or the like may be added if necessary. Alternatively, an ionic bond compound of a dye cation and a singlet oxygen quencher anion is advantageously used as the organic dye.

For the formation of the recording layer 2, for example, the organic dye is dissolved in an organic solvent to prepare a coating solution, and the coating solution is applied onto the substrate 1 by spin coating. In this instance, preferably, the organic dye content in the solution, the thickness of the recording layer 2, and the like are adjusted so as to obtain a sufficient reflectance after the formation of the reflective layer 3.

Although the organic solvent used in the coating solution of the recording layer 2 is varied depending on the dye and the material of the substrate 1, preferred solvents include 2,2,3,3-tetrafluoro-1-propanol, which is a fluorinated alcohol with a boiling point of 60° C. or more, 2-ethoxyethanol, diacetone alcohol, and cyclohexane. These solvents may be used singly or in combination. Fluorinated alcohols with a boiling point of less than 60° C. are sufficiently dried in a known step for coating an organic dye under conventional high temperature and humidity conditions, but disadvantageously have a high drying rate. Accordingly, it is difficult to uniformly applying an organic dye.

Other solvents may be added if necessary. However, a solvent capable of dissolving the organic dye not attacking the substrate must be selected.

The spin coating is preferably performed at rotation speeds of 3000 rpm or more, for example, in the range of about 3000 to 5000 rpm, and more preferably in the range of 4000 to 5000 rpm, for example, in the range of about 4500 to 5000 rpm. By setting the rotation speed in these ranges, the solvent can be efficiently removed.

Although the solvent remains in the recording layer 2 formed by the spin coating, the reflective layer 3 can be subsequently formed on the recording layer 2 without drying. The thickness of the reflective layer 3 is set, for example, in the range of 10 to 500 nm. The reflective layer 3 is formed of an elemental metal, such as Au, Ag, Cu, Cr, Ni, Si, or Ge, or its metallic compound containing other metals by sputtering. Since a large degree of the residual solvent can be removed from the recording layer 2 in this sputtering, a drying step here also can be omitted to reduce manufacturing time significantly.

The reflective layer 3 is covered with the protective layer 4 with a thickness in the range of about 1 to 50 $\mu$m. The protective layer 4 is not particularly limited in material as long as protecting the recording layer 2, the reflective layer 3, and other layers. In general, a UV-curable acrylic resin is used because it facilitates the formation of the protective layer. Other organic materials, such as vinyl chloride resin, epoxy resin, and polyester, and inorganic materials, such as $SiO_2$ and AlN, may be used singly or in combination. The protective layer 4 may have a multilayer structure in which different material layers are laid one on top of another.

The protective layer 4 may be provided with a label-printing layer (not shown in the figure) thereon. If an optical disc as shown in the figure is bonded with an adhesive layer provided on the opposite side to the light-incident side, the adhesive layer doubles the protective layer. Preferably, the formation of the protective layer is performed by spin coating to prevent the reflective layer 3 from being damaged. However, it may be performed by screen printing, dipping, or spray coating.

Figure 2:
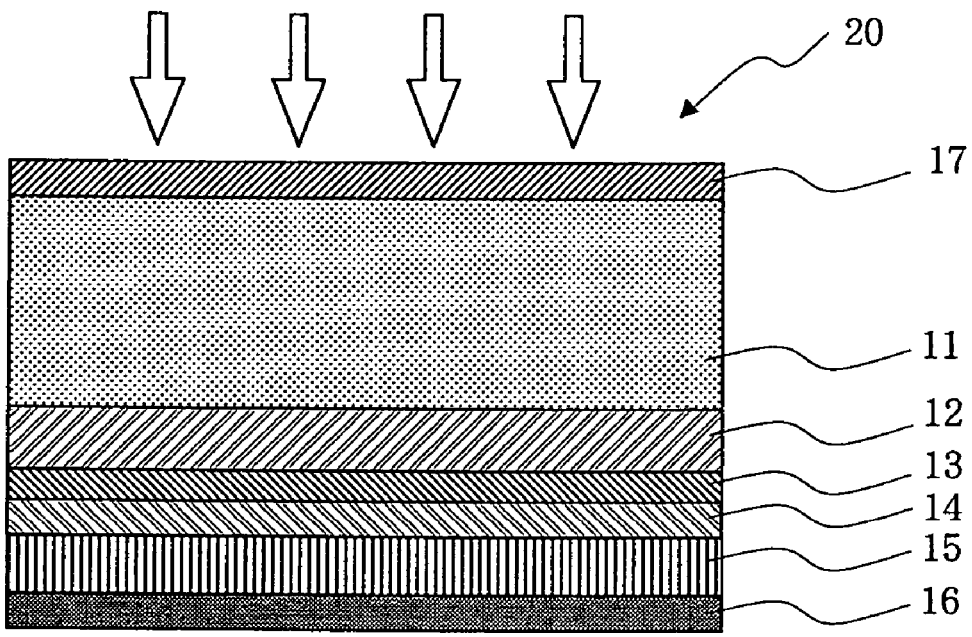
FIG. 2 is a schematic sectional view of an optical disc according to another embodiment of the present invention.

FIG. 2 shows a schematic sectional view of an optical disc according to another preferred embodiment of the present invention. The optical disc 20 includes a first dielectric layer 12, a recording layer 13, a second dielectric layer 14, and a reflective layer 15, in that order, on one surface of a light-transmissive substrate 11, and a hard coating layer 17 on the other surface. The recording layer 13 is of a phase change type to writ by phase-change recording. A protective or adhesive layer 16 may be provided if necessary. The layers of the optical disc 20 other than the hard coating layer 17 are not particularly limited in their forming conditions as long as the hard coating layer 17, which is provided on the light-incident side, satisfies the above-described requirements.

The first dielectric layer 12 principally serves to protect the recording layer 13 and its thickness is preferably set in the range of 40 to 250 nm. The first dielectric layer 12 is not particularly limited in material, and may be formed of oxides, nitrides, sulfides, and carbides of Si, Al, Ta, and Zn, such as $SiO_2$, $Si_3O_4$, $Al_2O_3$, AlN, TaO, and ZnS.

The phase-change recording layer 13 is formed of a phase-change material. Data is written to the recording layer 13 through the use of a difference between the reflectances of the phase-change material in crystalline form and in amorphous form. In order to change a crystalline form in a region of the recording layer 13 into an amorphous form, a laser beam emitted from the light-transmissive substrate 11 is given a pulsed waveform with an amplitude from a writing power $P_w$ to a base power $P_b$. Thus, the recording layer 13 is heated at temperatures of the melting point or more, followed by rapid cooling. Thus, the region melted by the writing power $P_w$ is changed to an amorphous form to result in a recording mark. On the other hand, in order to change an amorphous form in a region of the recording layer 13 into a crystalline form, the power of the laser beam emitted from the light-transmissive substrate 11 is set at an erasing power $P_e$ so as to heat the recording layer 13 to a temperature of its crystallization temperature or more. Thus, the region heated to the crystallization temperature or more is crystallized after subsequent cooling.

The recording layer 13 is not particularly limited in material, but preferably contains a SbTe-based material. The SbTe-based material may comprise only Sb and Te, or further comprise at least one of In, Ag, and Ge, that is, InSbTeGe, AgInSbTe, or AgInSbTeGe. Preferably, the thickness of the recording layer 13 is set in the range of 10 to 30 nm.

The second dielectric layer 14 principally serves to protect the recording layer 13 as with the first dielectric layer 12, and its thickness is preferably set in the range of 5 to 200 nm, and more preferably in the range of 10 to 30 nm. The second dielectric layer 14 is not particularly limited in material, but is, preferably, formed of the same material as the first dielectric layer 12.

The reflective layer 15 serves to reflect the laser beam incident from the light-transmissive substrate side to emit the beam from the substrate 11 again, and preferably has a thickness in the range of 20 to 400 nm. The reflective layer 15 is not particularly limited in material, but is preferably formed of an alloy principally containing Ag or Al. Alternatively, Au or Pt may be used.

The first dielectric layer 12, the recording layer 13, the second dielectric layer 14, and the reflective layer 15 may be deposited on the surface having pre-grooves of the light-transmissive substrate 11 by sputtering. The light-transmissive substrate 11 and the protective layer 16 may be formed under the same conditions as in the formation of the light-transmissive substrate 1 and protective layer 4 of the optical disc 10 shown in FIG. 1, but not particularly limited.

EXAMPLES

Examples of the present invention will now be described in detail.

A hard coating solution was prepared as follows, which was essentially composed of a UV-curable acrylic resin containing dispersed colloidal silica with a mean particle size of about 10 nm and PGMEA as the solvent.

Reactive group-modified colloidal silica: 50 parts by weight
Dipentaerythritol hexaacrylate: 48 parts by weight
Tetrahydrofurfuryl acrylate: 12 parts by weight
PGMEA: 90 parts by weight
Methyl ethyl ketone (MEK): 10 parts by weight
Irgacure 184 (polymerization initiator, produced by Ciba Specialty Chemicals Inc.): 5 parts by weight To the mixture of these materials, 0.002 part by weight of bifunctional silicone methacrylate (X-22-164A, molecular weight: 1500, produced by Shin-Etsu Chemical Co., Ltd.) was added to yield the hard coating solution. The total solid content was 53.5 percent by weight, and contained 43.5 percent by weight of colloidal silica relative to the total solid content.

The hard coating solution was applied onto PC mirror substrates with a diameter of 12 cm at different rotation speeds, holding times, and thicknesses. Then, the solution was exposed to UV light at an integrated light quantity of 1740 mJ to be cured, thus forming the hard coating layer.

After curing, the hard coating layer on each substrate was cut into pieces in about 5-mm square form. The pieces were placed in a vial tube and subjected to measurement of the residual solvent content in the hard coating layer by head-space gas chromatography (GC). Specifically, after heating the vial tube at 150° C. for one hour, 0.4 cc of the sample pieces was analyzed with a GC column PEG20M produced by Shimadzu Corporation, a flame ionization detector (FID), and $N_2$ carrier gas, using a head space portion HSS2B and a gas chromatograph GC-14B, both produced by Shimadzu Corporation.

Figure 3:
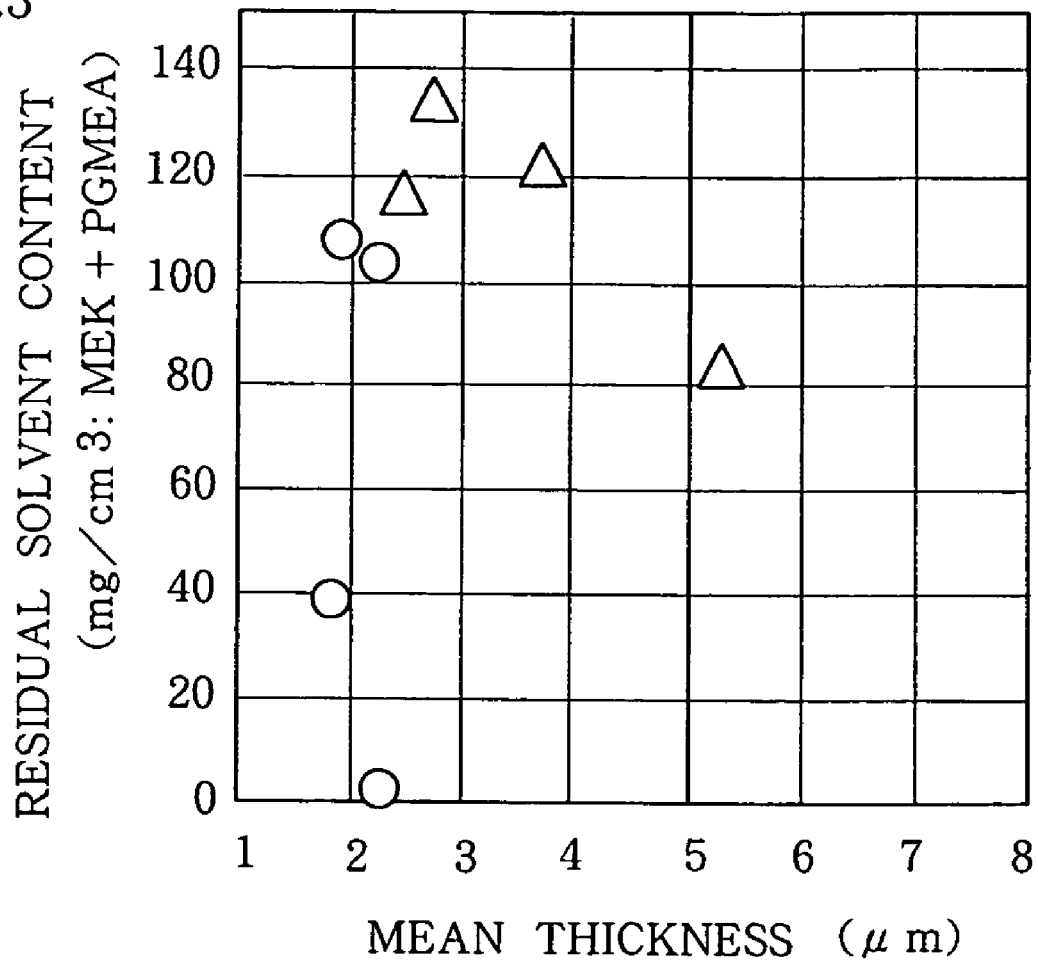
FIG. 3 is a plot of the relationship between the thickness and residual solvent content of the hard coating layer according to an embodiment of the present invention.

The results are shown in Table 1 and FIG. 3. In the figure, triangles represent samples exhibiting a crack during storage at a high temperature of 90° C. for 24 hours, and circles represent samples exhibiting no crack. Table 1 and FIG. 3 show that a residual solvent content of more than 110 $mg/cm^3$ in a 12-cm disc or a film thickness of more than 5 μm results in cracks.

TABLE 1

|  | Mean thickness (μm) | Residual solvent quantity (μg/piece) | | | Residual solvent content ($mg/cm^3$) | Crack occurrence |
| --- | --- | --- | --- | --- | --- | --- |
|  |  | PGMEA | MEK | Total |  |  |
| Comparative example 1 | 2.51 | 2953 | 58.8 | 3012 | 115.9 | Yes |
| Comparative example 2 | 2.73 | 3755 | 44 | 3799 | 134.2 | Yes |
| Comparative example 3 | 3.71 | 4622 | 44.8 | 4667 | 121.5 | Yes |
| Comparative example 4 | 5.32 | 4544 | 18.4 | 4562 | 82.9 | Yes |
| Example 1 | 1.87 | 711 | 26.4 | 738 | 38.2 | No |
| Example 2 | 1.96 | 2160 | 28 | 2188 | 107.9 | No |
| Example 3 | 2.28 | 2441 | 28.4 | 2469 | 104.6 | No |
| Example 4 | 2.30 | 48 | 6.4 | 55 | 2.3 | No |

A DVD-R (diameter: 12 cm, clamping area diameter: 3.5 cm) was provided with a hard coating layer containing more than 110 $mg/cm^3$ of residual solvent so as to crack, and the cracked portion was subjected to writing and reading. As a result, it has been shown that the occurrence of errors is increased extremely. In contrast, a DVD-R given a crack after writing did not exhibit a negative effect of the crack on reading. Thus, it has been shown that the residual solvent content particularly affects recording DVD media.

For an abrasion test and a haze test, the foregoing hard coating solution was applied onto a 12-cm PC mirror substrate with no groups and subsequently was sufficiently cured in a $N_2$ flow by UV light to form a hard coating layer containing 110 $mg/cm^3$ or less of residual solvent and having a thickness in the range of 1 to 5 μm. The UV curing was performed at an integrated light quantity of 1740 mJ.

After curing, the inner circumference of the resulting disc was subjected to 500-revolution abrasion at a load of 500 g in accordance with JIS K 7204 using an abrasion tester Model 503, produced by Taber Instrument Corporation, and an abrasion wheel CS10F having an approximate abrasive grain size (number of abrasion grains per square centimeter) of 1420. Then, the haze value was measured with a full-automatic haze meter TC-H III DPK, produced by Tokyo Denshoku in accordance with JIS K 7136. Thus, haze values before and after abrasion were compared. The difference between the haze values after and before abrasion was represented as Δhaze. As a result, the Δhaze of the resulting hard coating layer was in the range of 2% to 10%, exhibiting a hardness sufficient to resist abrasion and scratches.

What is claimed is:

1. An optical disc comprising:
   a light-transmissive substrate;
   a recording layer, a reflective layer, and a protective layer provided, in that order, on one surface of the substrate; and
   a hard coating layer having a thickness in the range of 1 to 5 μm on another surface of the substrate, wherein the hard coating layer is produced by a process comprising applying to the substrate and curing a solution comprising a hard coating agent containing colloidal silica, a UV-curable acrylic resin, and a solvent principally containing propylene glycol monomethyl ether acetate; and
   the hard coating layer comprises the colloidal silica, a cured resin consisting of the UV-curable acrylic resin after the curing, and 10 to 110 $mg/cm^3$ of the solvent.

2. An optical disc according to claim 1, wherein the colloidal silica has a mean particle size of 100 nm or less.

3. An optical disc according to claim 1, wherein the colloidal silica content in the hard coating agent is 40 percent by weight or more relative to the total solid content in the hard coating agent.

4. An optical disc according to claim 1, wherein the difference between haze values of the hard coating layer before and after an abrasion test is in the range of 2% to 10%, the haze values being obtained from a haze test in accordance with JIS K 7136, the abrasion test being conducted in accordance with JIS K 7204, using an abrasion wheel CS10F at a load of 500 g and 500 revolutions.

5. A method for manufacturing an optical disc as set forth in any one of claims 1 to 4, the method including the step of forming the hard coating layer by applying the hard coating solution onto the other surface of the substrate by spin coating at a rotation speed of 8000 rpm or more and a holding time of 0.5 seconds or more and curing the solution without heating and drying.

6. A method of manufacturing an optical disc, the method comprising applying on a light-transmissive substrate a solution comprising a hard coating agent containing colloidal silica, a UV-curable acrylic resin, and a solvent principally containing propylene glycol monomethyl ether acetate;

curing the solution; and producing the optical disc of claim 1.

7. A method of manufacturing an optical disc, the method comprising applying a recording layer, a reflective layer, and a protective layer, in that order, on one surface of a light-transmissive substrate;

applying on another surface of the substrate a solution comprising a hard coating agent containing colloidal silica, a UV-curable acrylic resin, and a solvent principally containing propylene glycol monomethyl ether acetate; and curing the solution, without heating the hard coating agent, to form a hard coating layer containing 10 to 110 mg/cm$^3$ of the solvent.

8. An optical disc according to claim 1, wherein the solvent further contains methyl ethyl ketone.

9. An optical disc according to claim 1, wherein the content of the propylene glycol monomethyl ether acetate in the solvent is at least 75 percent by weight.

* * * * *